No. 700,030. Patented May 13, 1902.
C. H. GERLING.
SEED OR POTATO PLANTER.
(Application filed Mar. 11, 1902.)

(No Model.) 2 Sheets—Sheet I.

No. 700,030. Patented May 13, 1902.
C. H. GERLING.
SEED OR POTATO PLANTER.
(Application filed Mar. 11, 1902.)
(No Model.) 2 Sheets—Sheet 2.
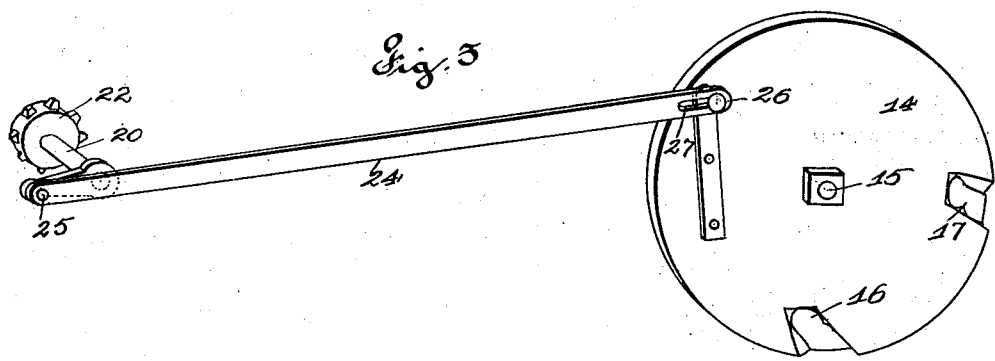
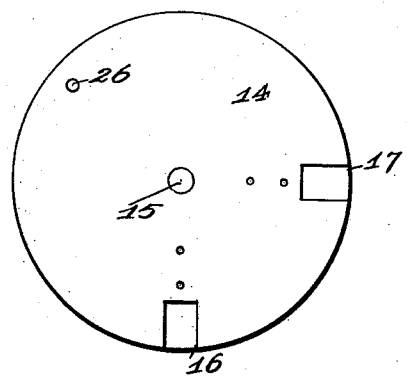
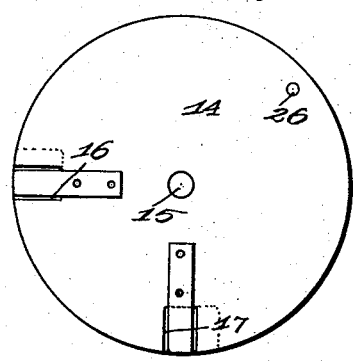
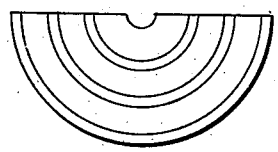
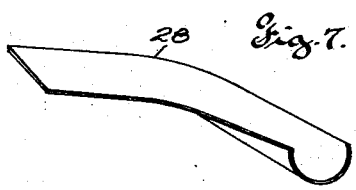
Witnesses
Alfred W Eicks
Frank Turner
Inventor
C. H. Gerling.
by Higdon & Longan Attys

UNITED STATES PATENT OFFICE.

CHARLES H. GERLING, OF EDWARDSVILLE, ILLINOIS.

SEED OR POTATO PLANTER.

SPECIFICATION forming part of Letters Patent No. 700,030, dated May 13, 1902.

Application filed March 11, 1902. Serial No. 97,782. (No model.)

*To all whom it may concern:*

Be it known that I, CHARLES H. GERLING, of the city of Edwardsville, Madison county, State of Illinois, have invented certain new and useful Improvements in Seed or Potato Planters, of which the following is a full, clear, and exact description, reference being had to the accompanying drawings, forming a part hereof.

My invention relates to potato and seed planters; and it consists of the novel construction, combination, and arrangement of parts hereinafter shown, described, and claimed.

My object is to construct a seed-planter with a dropper which will handle potatoes and the like without clogging and without injury to the seed; and my invention consists of the combination, with a suitable framework having traction drive-wheels and having a furrow-opener and a seed-coverer, of a hopper, a seed-wheel mounted adjacent to the hopper for oscillation and having pockets to receive the seed from the hopper, a crank-shaft connected to the drive-wheel, a crank-pin upon the seed-wheel, a connecting-rod connecting the crank-shaft pin to the seed-wheel crank-pin, the crank-pin bearing in one end of the connecting-rod being slotted to make a jerking motion and so that as the crank-shaft rotates the seed-wheel is oscillated to take seed from said hopper into said pockets and throw the seed upwardly and outwardly in both directions, and conveyers to receive said seed and carry it to the furrow behind said furrow-opener.

Figure 1:
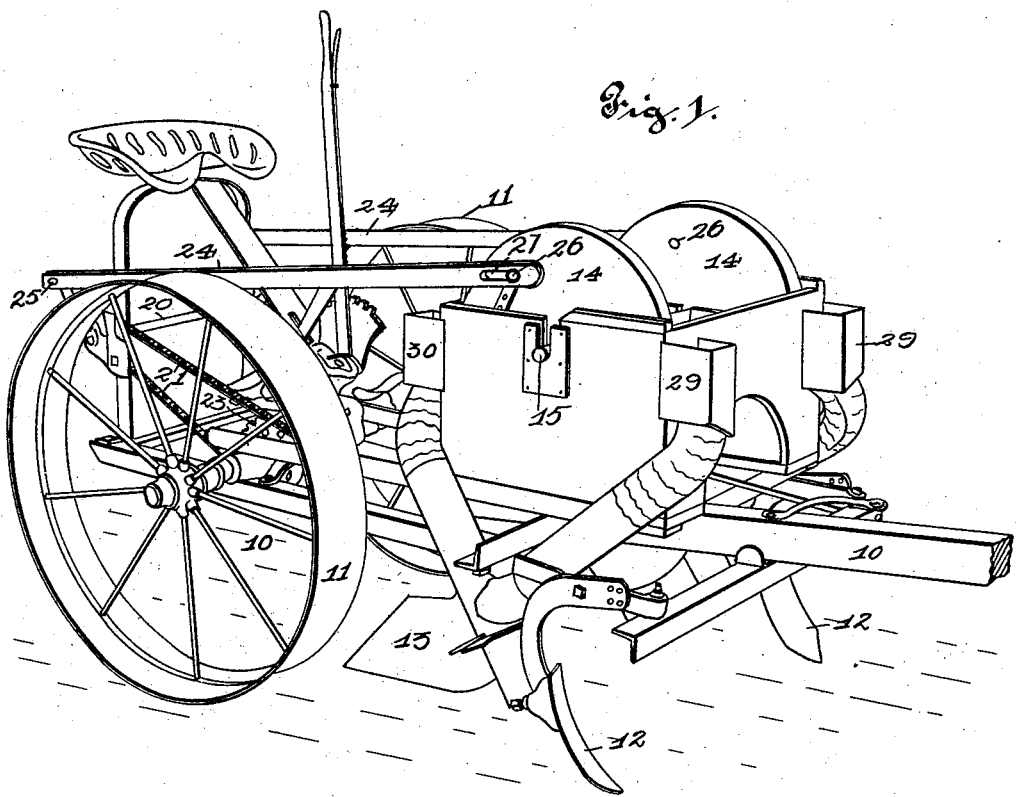
Figure 2:
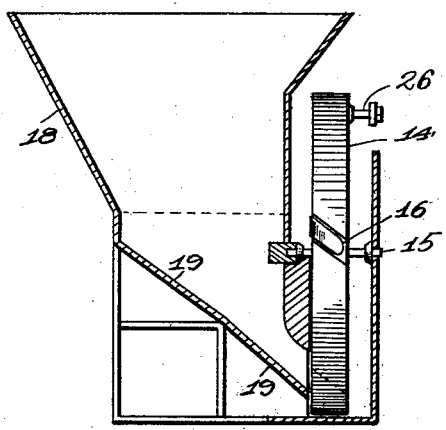

Figure 1 is a view in perspective of a seed-planter embodying the principles of my invention. Fig. 2 is a cross-section through the hopper and seed-wheel. Fig. 3 is a view in perspective showing the crank-shaft, the seed-wheel, and the connecting-rod connecting the crank-shaft to the seed-wheel. Fig. 4 is a front elevation of the seed-wheel with the adjustable plates removed. Fig. 5 is a view analogous to Fig. 4 with the adjustable plates replaced. Fig. 6 is a view in elevation of a guide-plate forming part of the hopper. Fig. 7 is a view in perspective of one of the adjustable plates used in regulating the size of the pockets in the seed-wheel.

Referring to the drawings in detail, the framework 10 is mounted upon the traction drive-wheels 11 and carries the furrow-openers 12 and the seed-coverers 13. The seed-wheels 14 are mounted to oscillate upon the pivots 15 and have pockets 16 and 17 to receive the seed. The hopper 18 is mounted adjacent the seed-wheel and leads to the pockets 16 and 17. The crank-shaft 20 is mounted in the frame, and a sprocket-chain 21 connects a sprocket-wheel 22 upon the crank-shaft to a similar sprocket-wheel 23 upon the axle, as required to drive the crank-shaft from the traction drive-wheels. A connecting-rod 24 connects the crank-pin 25, carried by the crank-shaft 20, to the crank-pin 26, carried by the seed-wheel, and the bearing 27 in one end of the connecting-rod 24 is slotted to provide a jerky motion. The distance between the crank-pin 26 and the center is greater than the distance between the crank-pin 25 and the center of the crank-shaft, so that as the crank-shaft rotates the seed-wheel is oscillated. The seed-wheel 14 is a circular wooden disk having notches cut from its periphery substantially ninety degrees apart, as shown in Fig. 4, and said notches are cut at an angle of about forty-five degrees relative to the face of the wheel, as shown in Fig. 2.

The adjustable plates are made of thin tempered steel possessing resilient qualities bent into the form shown and adjustably mounted into slots, as shown in Fig. 5. The size of the pockets 16 and 17 may be regulated by adjusting these plates in or out.

As the crank-shaft 20 revolves the seed-wheel is oscillated through an arc of about ninety degrees. When the pocket 16 is on a level with the center, as shown in Fig. 5, the pocket 17 is vertically beneath the center, and when the seed-wheel is oscillated in the other direction the pocket 16 is vertically below the center and the pocket 17 is upon the opposite side of the center from the position of the pocket 16 in Fig. 5. When the pocket 17 is in a vertical position, it receives a potato or other seed from the hopper 18, and when it is jerked to a horizontal position the seed is thrown upwardly and outwardly into the conveyers 29 in front of the seed-wheels, and when the motion is reversed the seed is taken into the pocket 16 and thrown upwardly and outwardly into the conveyers 30 at the rear of the seed-wheels, and the seed passes downwardly through said conveyers to the furrows behind the furrow-openers 12.

Heretofore there has been great difficulty in dropping potatoes and the like from a hopper mechanically, due to the fact that the seed is liable to clog in the outlet of the hopper and either stop flowing or the device which measures the seeds will cut and injure the seeds. The seed-wheel 14 starts with an upward motion, and when the pocket is filled with seed the surplus is forced upwardly and backwardly into the hopper, the seed being held in the hopper only by the force of gravity, whereas if the seed was taken from the hopper with a downward motion the surplus could not recede into the hopper and must be cut and bruised. The success of my invention depends upon the principle of taking the seed from the hopper with an upward motion, which allows the surplus to overcome the force of gravity and pass backwardly and upwardly into the hopper.

If it is desired to drop the seed from the conveyers 29 and 30 at regularly-spaced distances, an ordinary check-rower may be attached to control and regulate the passage of the seeds from the conveyers.

I claim—

1. The combination with a suitable framework having traction drive-wheels, of a hopper; a seed-wheel mounted adjacent to the hopper and having pockets to receive the seed from the hopper; and a crank connection between the seed-wheel and the drive-wheels whereby the seed-wheel is oscillated to take the seed into the said pockets and throw it upwardly; substantially as specified.

2. In a seed-planter, a suitable hopper; a seed-wheel mounted adjacent to the hopper and having pockets to receive the seed from the hopper; and means for oscillating the seed-wheel to take seed into said pockets and throw it upwardly and outwardly; substantially as specified.

3. In a seed-planter, a seed-wheel mounted for oscillation upon a pivot and having pockets below the pivot; means for conducting the seed to said pockets; and means for oscillating the seed-wheel to throw the seed upwardly; substantially as specified.

4. A seed-planter comprising the combination with a suitable framework having traction drive-wheels and having a furrow-opener and a seed-coverer, of a hopper; a seed-wheel mounted adjacent to the hopper and having pockets to receive the seed from the hopper; a crank-shaft connected to the drive-wheels; a crank-pin upon the seed-wheel; a connecting-rod connecting the crank-shaft pin to the seed-wheel crank-pin, the crank-pin bearing in one end of the connecting-rod being slotted to give a jerky motion so that as the crank-shaft rotates the seed-wheel is oscillated to take seed from said hopper into said pockets and throw it upwardly and outwardly in both directions; and conveyers to receive said seed and carry it to the furrow behind said furrow-opener; substantially as specified.

In testimony whereof I affix my signature in presence of two witnesses.

CHAS. H. GERLING.

Witnesses:
　THOS. WILLIAMSON,
　FRANCES E. BROWN.